(12) United States Patent
De Kleine et al.

(10) Patent No.: US 9,468,146 B2
(45) Date of Patent: Oct. 18, 2016

(54) HARVESTING MACHINE FOR FORMALLY TRAINED ORCHARDS

(71) Applicant: Washington State University, Pullman, WA (US)

(72) Inventors: Mark De Kleine, Prosser, WA (US); Manoj Karkee, West Richland, WA (US); Yunxiang Ye, Prosser, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 14/533,635

(22) Filed: Nov. 5, 2014

(65) Prior Publication Data
US 2016/0120124 A1    May 5, 2016

(51) Int. Cl.
*A01D 46/22*    (2006.01)
*A01D 46/26*    (2006.01)

(52) U.S. Cl.
CPC ....... *A01D 46/264* (2013.01); *A01D 2046/266* (2013.01)

(58) Field of Classification Search
CPC ........... A01D 46/26; A01D 2046/266; A01D 2046/262; A01D 2046/268; A01D 46/24; A01D 46/28
USPC ..................................... 56/328.1, 340.1, 329
See application file for complete search history.

(56) References Cited

U.S. PATENT DOCUMENTS

| | | | | |
|---|---|---|---|---|
| 2,674,500 A | * | 4/1954 | Hukari | A01D 46/20 182/113 |
| 2,690,639 A | * | 10/1954 | Goodwin | A01D 46/26 56/340.1 |
| 2,804,743 A | * | 9/1957 | Gould | A01D 46/26 56/340.1 |
| 2,891,372 A | * | 6/1959 | Goodwin | A01D 46/26 56/340.1 |
| 3,041,811 A | * | 7/1962 | Sides | A01D 46/26 56/340.1 |
| 3,059,402 A | * | 10/1962 | Shipley, Jr. | A01D 46/26 56/340.1 |
| 3,084,967 A | * | 4/1963 | Harrett | A01D 46/26 294/99.1 |
| 3,121,304 A | * | 2/1964 | Herbst | A01D 46/26 56/340.1 |
| 3,174,269 A | * | 3/1965 | Londo | A01D 46/26 30/381 |
| 3,184,902 A | * | 5/1965 | Maffei | A01D 45/22 460/135 |
| 3,218,790 A | * | 11/1965 | Edgemond, Jr. | A01D 46/26 180/24.06 |
| 3,225,529 A | * | 12/1965 | King | A01D 46/26 56/340.1 |

(Continued)

*Primary Examiner* — Árpád Fábián-Kovács
(74) *Attorney, Agent, or Firm* — Whitham, Curtis & Cook, P.C.

(57) ABSTRACT

The embodiments are directed to a fruit harvesting system that includes at least one end-effector coupled to a distal end of the manipulating arm and configured using at least one of a jaw and a clamp to couple to one or more branches of a fruit tree or a trellis wire that is coupled to the fruit tree residing in a trained orchard. The embodiments also include a pair of dual motor actuators eccentrically coupled to the at least one end-effector and directed to manipulate the at least one end-effector with a same or different frequency, and amplitude, and with same or counter-propagating motions, wherein the directed same or different frequency and amplitude, and same or counter-propagating motions provide one or more eccentric shaking patterns to the coupled branches or the trellis wire so as to enable fruit to be removed and collected by catch frames.

9 Claims, 5 Drawing Sheets

(56) References Cited

U.S. PATENT DOCUMENTS

| | | | | |
|---|---|---|---|---|
| 3,377,786 A * | 4/1968 | Edgemond, Jr. | A01D 46/26 | 56/340.1 |
| 3,406,508 A * | 10/1968 | Fridley | A01D 46/26 | 56/340.1 |
| 3,457,712 A * | 7/1969 | Gould | A01D 46/26 | 56/340.1 |
| 3,479,806 A * | 11/1969 | Pool | A01D 46/26 | 56/340.1 |
| 3,491,520 A * | 1/1970 | Watson | A01D 46/26 | 254/132 |
| 3,509,702 A * | 5/1970 | Rickerd | A01D 46/26 | 56/328.1 |
| 3,579,970 A * | 5/1971 | Gilbert | A01D 46/26 | 248/654 |
| 3,621,643 A * | 11/1971 | Gerrans | A01D 46/26 | 56/329 |
| 3,656,287 A * | 4/1972 | Morrison | A01D 46/26 | 248/654 |
| 3,796,031 A * | 3/1974 | Fridley | A01D 46/26 | 56/340.1 |
| 4,269,021 A * | 5/1981 | Friday | A01D 46/26 | 56/329 |
| 5,595,054 A * | 1/1997 | Reynolds de Sousa | A01D 46/26 | 56/340.1 |
| 2005/0126144 A1 * | 6/2005 | Koselka | A01D 46/30 | 56/10.2 R |
| 2006/0213167 A1 * | 9/2006 | Koselka | A01D 46/30 | 56/10.2 A |
| 2011/0047951 A1 * | 3/2011 | Moore | A01D 46/24 | 56/234 |
| 2011/0232256 A1 * | 9/2011 | Berthet | A01D 46/28 | 56/328.1 |

* cited by examiner

HARVESTING MACHINE FOR FORMALLY TRAINED ORCHARDS

BACKGROUND OF THE INVENTION

1. Field of the Invention

The present embodiments herein relate to the field of fruit-harvesting systems and more particularly to a novel system designed to enhance the bulk harvesting of fresh-market apples and like fruit.

2. Discussion of the Related Art

All fruit, such as, for example, oranges, pears and apples, were once picked by hand, one fruit at a time and handled in small containers also one at a time by hand. Because most fruit bruises easily, ripens unevenly, grows on tress in different shapes and sizes, even in the same orchards, the mechanization of picking such diverse fruit is thus often complicated but desirable in light of the labor costs of harvesting.

In particular, harvesting labor accounts for 50% of the total tree fruit production cost. This labor cost continues to rise as a labor shortage has been developing over the last several decades in agriculture. Labor issues thus remain the biggest challenge for tree fruit industry in the near future and as a result, has driven a need for developing improved mechanical harvesting techniques in apple and other specialty crop orchards. In fact, today's progressive growers are adopting new horticulture practices that allow for trees and/or tree limbs to be trellised to a post or wire; these types of orchards are becoming the industry standard because, amongst other benefits, trellised systems may be suitable for automated and mechanized harvesting techniques.

Background information on an umbrella shaped tree fruit catching system and method is described in U.S. patent application No. 2340004, entitled: "Apparatus for gathering Apples And Like Fruit," to E. Muller filed Aug. 26, 1964, including the following: "The subject matter of the invention is a novel apparatus for gathering apples and like fruit in which the fruit is caught by a foldable or collapsible catch umbrella and is conducted directly from the umbrella into a transport cart or dolly which also serves as a carrier for the umbrella. The catch umbrella is unfolded substantially to twice the Width of the dolly and is provided with an in-feed opening that leads the fruit into the dolly; and the umbrella forms a trough or hopper which is downwardly inclined towards the in-feed opening."

Background information on a v-shaped tree fruit catching system and method is described in U.S. Patent Application Publication No. 2009/0025357, entitled: "Tree Fruit Collection Device V-Shaped Support," to Parsa, filed Jul. 26, 2007, including the following: "A tree fruit collection device includes a plurality of individual freestanding supports for arrangement radially extending from a tree trunk. At least one net element is suspended between the supports and secured at a proximal circumference of the net element around the tree trunk. The net element provides a frusto-conical surface to catch dropped fruit from the tree. Hook and loop fasteners or similar attachment devices are provided for removably securing the net element to the supports."

Further background information on an agriculture vehicle for pruning tree fruit so as to remove the human element in the process is described in U.S. Patent Application Publication No. 2011/0047951, entitled: "Fruit Tree Pruner and Harvesting Machine And Harvesting Machine, to Moore, filed Mar. 3, 2011, including the following: "[t]his invention relates to methods and apparatus for pruning of fruit bearing trees such as apples, pears, peaches, plums, apricots, cherries, avocadoes and citrus. AND also, this invention relates to methods and apparatus for harvesting of fruit from fruit bearing trees such as apples, pears, peaches, plums, apricots, cherries, avocadoes and citrus. The methods allow for individual removal of fruit that will meet the standards for the commercial fresh-market fruit requirements and will not require the fruit to be handled or removed by human hands. The harvesting process is automated and only requires the oversight and interactive control adjustments to the harvesting system."

With respect to fruit removal itself, two types of techniques have been the focus for past researchers: bulk (mass) and selective harvesting. Bulk harvesting techniques have also been researched widely while shake and catch (Tennes & Brown, 1985; Peterson, Bennedsen, Anger & Wolford, 1999; Peterson & Wolford, 2003) tends to be the primary approach for mass fruit removal. Tennes and Brown (1985) developed a sway bar shaking system that was mounted to an over-the-row harvester. Peterson and Wolford (2003) continued development of a narrow-inclined shake and-catch system (Peterson et al. 1999) that used two mirrored machines on each side of a row, similar to a commercial tart cherry harvesting system.

It is to be noted that despite past attempts, no mechanical or automated harvesting systems are commercially available in the world today for fresh-market quality apple. Selective harvesting is limited by the speed, robustness, and cost of the system, whereas bulk harvesting systems are limited largely due to the damage caused by fruit-to-fruit, fruit-to-branch, and fruit-to-collection surface contact during harvesting.

Thus, there is a need in the industry for a novel improved method and system of bulk-harvesting for fresh-market apple and like fruit. The system disclosed herein addresses this need using a novel end-effector design and catch system working in a cooperative manner.

SUMMARY OF THE INVENTION

It is to be appreciated that the present example embodiments herein are directed to a trained orchard mobile fruit harvesting system, that includes: a mobile platform; a manipulating arm operably coupled to a proximate end of the mobile platform; at least one end-effector coupled to a distal end of the manipulating arm and configured to be coupled to one or more branches of a fruit tree or a trellis wire that is coupled to the fruit tree residing in a trained orchard; a pair of dual motor actuators, wherein the dual motor actuators are eccentrically coupled to the at least one end-effector and directed to manipulate the at least one end-effector with a same or different frequency and amplitude, and with same or counter-propagating motions, wherein the directed same or different frequency and amplitude, and same or counter-propagating motions provide desired one or more eccentric shaking patterns to the coupled branches or the trellis wire in a controlled continuous or non-continuous manner; and one or more catch frames operably and rotatably coupled to the mobile platform for extension toward and retraction from, sections therebetween trees in a trained orchard having fruit to be harvested via the one or more eccentric shaking patterns.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. It is to be noted that as used herein, the term "adjacent" does not require immediate adjacency. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Specific Description

Figure 1A:
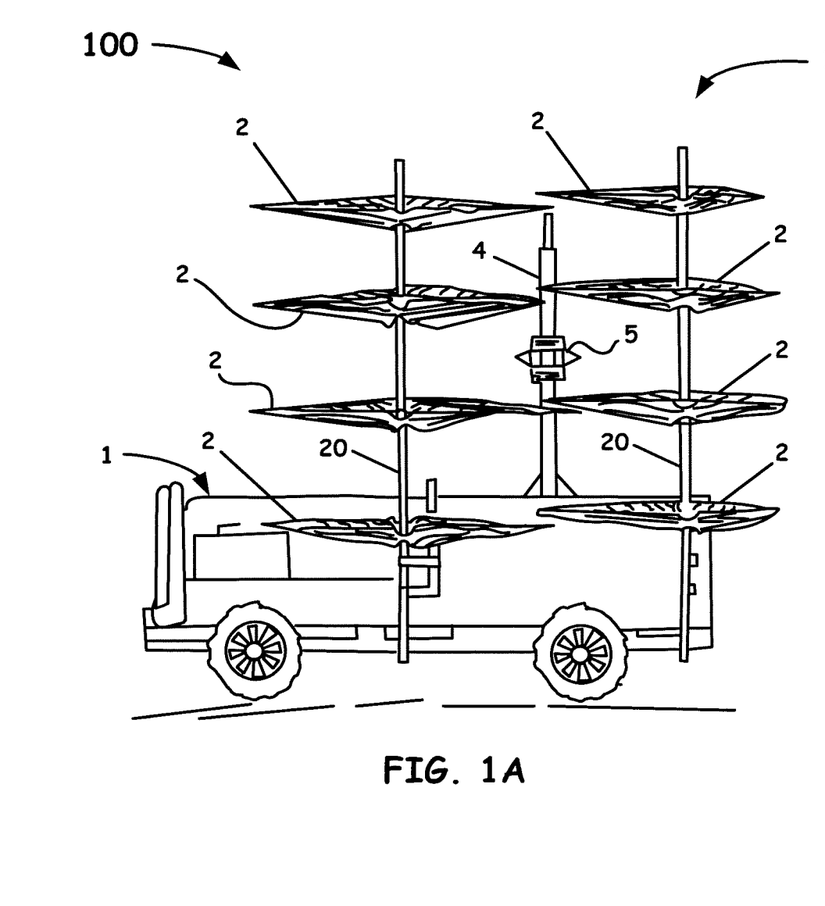
FIG. 1A shows a general side view depiction of the basic components of a layered harvesting system, as disclosed herein.
Figure 1B:
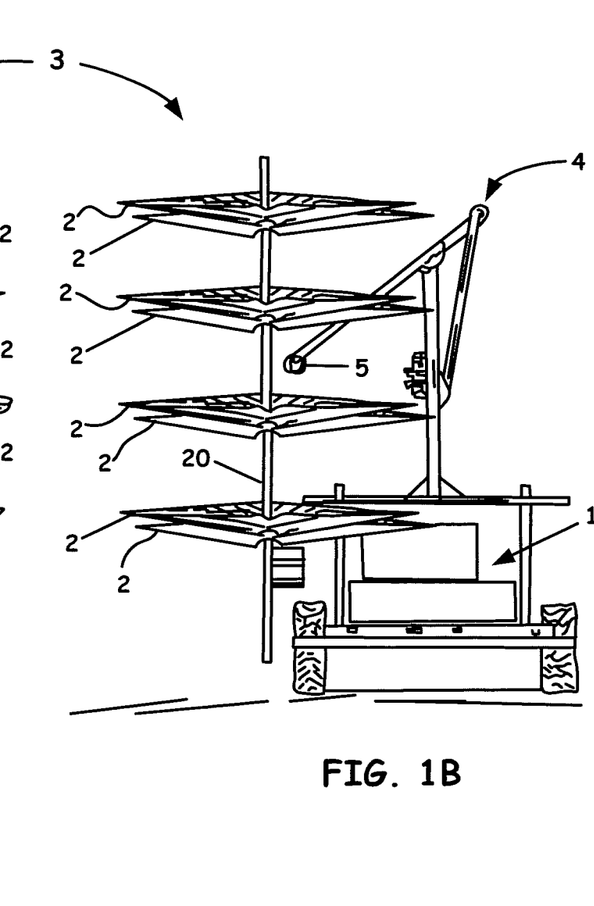
FIG. 1B shows a general back view depiction of the basic components of a layered harvesting system, as disclosed herein.

Turning now to the drawings, FIG. 1A and FIG. 1B, generally referenced by the character 100, illustrates alternate (side and back) general views of the basic components of a layered harvesting system of the present application configured for picking the fruit of pruned trees (i.e., trained), preferably apple trees, as well as pears, oranges, peaches cherries, plums, etc. It is also to be understood that reference to trees is merely illustrative, and that the invention is applicable to stalks and vines and other crops capable of being harvesting using the embodiments disclosed herein as well.

The often semi-autonomous mechanized system, as to be disclosed herein, can be adapted for applications for harvesting crops or fruits by using a picking but preferably a shaking mechanism of the plants upon which they grow and a catching (e.g., a single as well as a layered catch frame) mechanism. The example embodiment shown in FIG. 1A and FIG. 1B to enable such applications thus shows an often modified commercial mobile platform 1, a single but more often a layered (i.e., a plurality) catch-frame assembly 3, an automatic but more often a semi-autonomous powered manipulator arm 4, and an actuated end-effector 5.

The mobile platform 1 is often but not necessarily, a tractor-like commercial platform, such as, for example, a modified Blueline OPS Junior Orchard platform configured with a 4 cyl diesel engine and a hydraulic 4-wheel-drive system so as to be propelled through an orchard manually or automatically. To provide a non-limiting example reduced to practice working embodiment, the commercial worker platforms are removed and the operator control panel are remounted so that the mobile platform 1 can be driven from the ground in an automated fashion but more often when configured for manual operation.

The manipulating arm assembly 4 can be swiveled into a desired position using known mechanisms in the art, such as a worm gear set that rotates about a given z-axis. It is to be noted that the example embodiment of FIG. 1A and FIG. 1B illustrates a single manipulating arm 4 assembly having a height designed for pruning crops and fruit trees disclosed herein coupled to the end-effector 5. It is also to be noted that while FIG. 1A and FIG. 1B shows the manipulating arm assembly 4 example embodiment coupled to the end effector 5, it is also to be appreciated that the manipulating arm assembly 4 can also be coupled to a predetermined catch frame 2/catch frame assembly 3, as disclosed below, to provide another exemplary working novel embodiment.

Thus, in the example embodiment of FIG. 1A and FIG. 1B, the end-effector 5 shown coupled to the manipulating arm assembly 4, can as one example embodiment, be configured to directly pick fruit on a desired tree limb using a motorized counter-rotating wheel mechanisms or the end-effector 5 in combination with the system 100 can be configured as a fruit shaker system that grips one or more desired pruned tree branches or coupled trellis wires using the end-effector in a gripping (e.g., jaw, clamp) arrangement and then applying harmonic-type eccentric motions, as to be disclosed herein.

The gripping surfaces for the counter-rotating wheel mechanism end-effector 5 arrangement (not shown), when utilized, can thus be configured with soft material, such as, foam configured about surfaces to include rubber, or even just soft rubber, or like materials, with a desired coefficient of friction to minimize abrasive damage and provide removal without bruising the surface of the fruit.

In a basic operating maneuver using the counter-rotating wheel mechanism end-effector 5, the manipulating arm assembly 4 is directed in an automated but more often a semi-automated fashion, to desired hanging fruit on a tree so as to pull fruit from such trees from any number of branches. Such operations are often aided when desired via an on-board computer based, e.g., a controller, or hard switch control system (not shown) to selectively provide a desired operating condition.

Figure 5A:
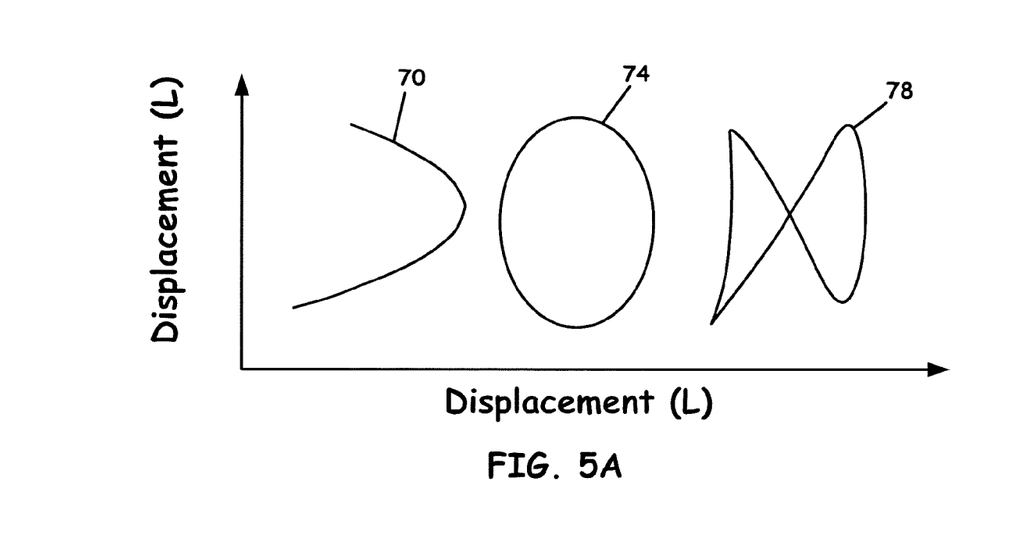
FIG. 5A shows a trio of non-limiting example eccentric harmonic patterns provided by the working embodiments disclosed herein.
Figure 5B:
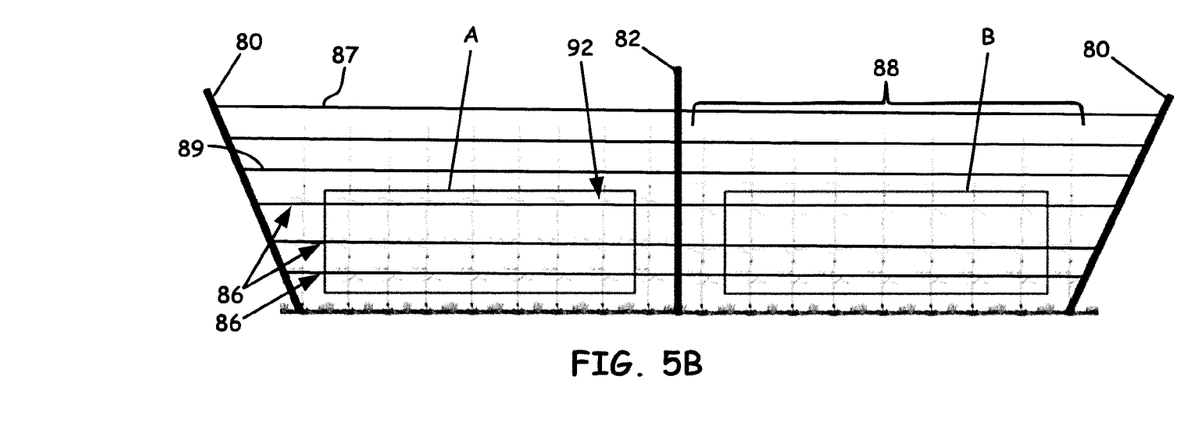
FIG. 5B shows a general depiction of an orchard row, divided into sections so as to enable the configurations herein to harvest the fruit provided by the trees.

While the counter-rotating wheel mechanism end-effector 5 configuration is beneficial, the end-effector 5 is more often configured to operate in conjunction with a dual motor actuator (DMA), to be discussed in detail below, which uses one or more eccentric configurations to manipulate a same or different amplitude or direction of rotation trajectory of the end-effector 5 as applied to one or more points, such as, for example, one or more points on a branch (92, as shown in FIG. 5) or a desired trellis wire (e.g., 86, 87, 89, as also shown in FIG. 5) of the pruned trees (i.e., trained) in a configured orchard.

Such a novel and unobvious mechanism allows an infinite number of rhythmic patterns to be realized in a physically defined space related to the displacement, or radius, of an eccentric, as disclosed herein. The DMA can be used to apply patterns to limbs at low frequency or in some cases high frequency to include combinations of non-continuous or continuous motions, such as reciprocating and/or more often non-symmetrical motions that are designed with desired forces to remove fruit having various lengths of stem attachment to their respective tree branches.

In this shaking-type arrangement, the manipulating arm 4 is configured to direct one or more grasping-type (detailed later herein) end-effectors 5 to one or more points, such as, for example, one or more points on a branch or a desired trellis wire of the pruned trees. The layered catch frame assembly 3 is again positioned therebetween the trained trees in the orchard and under the fruit and when any number of fruit is shaken from respective stems, the plurality of fruit drops a desired short distance so as to be distributed to any of the catch platforms 2 that make up the layered catch frame assembly 3.

It is to be appreciated that the mobile platform 1, as an aid to the embodiments disclosed herein, can be GPS guided via a tracking antenna (not shown) to enable guidance between rows of trees. Moreover, digital cameras (also not shown) can be integrated with the mobile platform 1 (e.g., for the example system of FIG. 1A) to enable the GPS system to determine distances for the manipulating arm 47 to guide its coupled end effector 5 to desired fruit to be removed or guide an end-effector 60, 61 like that shown in FIG. 4A and/or FIG. 4B, to tree branches or trellis wires for shaking mass fruit removal application so as to in any of the configurations, enable fruit to be effectively and gently captured by one or more catch frames 2.

Figures 2A, 2B, 2C, 2D:
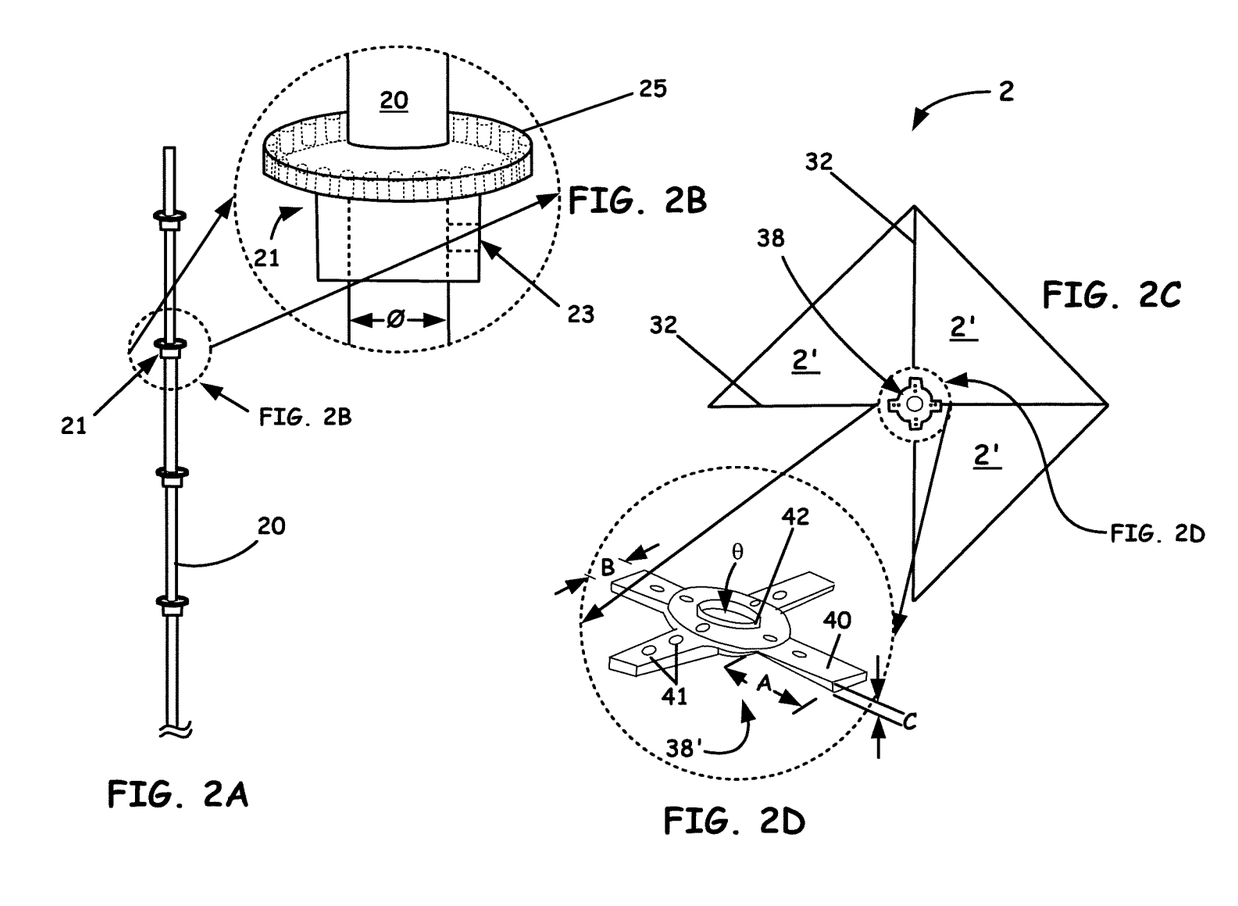
FIG. 2A illustrates a vertical support shaft and removably secured shaft collars coupled to a bearing arrangement to be utilized with an example catch frame assembly of the present invention.
FIG. 2B shows an expanded view of FIG. 2A to highlight the support shaft/shaft collars as coupled to a bearing arrangement disclosed herein.
FIG. 2C illustrates an example embodiment of an individual catch frame to include a support framework, a catch material, and a rotational assembly.
FIG. 2D shows an exploded view of the rotational arm assembly that is configured with each catch frame assembly, as shown in FIG. 2C.

FIG. 2A, FIG. 2B, FIG. 2C, and FIG. 2D in more detail shows example components for each catch frame 2 embodiment and resultant layered catch frame assembly 3 that can be coupled to the mobile platform 1, as shown in FIG. 1. It is to be appreciated again that the layered catch frame assembly 3 is designed to provide a padded, close proximity bed that as an example embodiment is configured with a coupled rotational assembly, as shown in FIG. 2D, to enable the catch frame, as shown in FIG. 2C, to be inserted between and/or around fruit bearing trees, as disclosed herein.

FIG. 2A thus shows the vertical support shaft 20, as also shown in FIG. 1, of an example embodiment of a catch frame configured from a metal, such as steel, aluminum, etc., FIG. 2A also shows plurality of removably secured shaft collars 21 configured to be fixedly secured to desired positions using, for example, a securing means 23 (denoted by dashed lines in FIG. 2B) so as to enable a desired catch frame 2 height.

In particular, FIG. 2B shows an expanded view of the shaft collars 21 designed with an inner diameter Ø of often at least 1 inch. Thus, each individual shaft collar 21 movably rides along the support shaft 20 that correspondingly has an outside diameter so as to enable each shaft collar 21 to be positioned at desired heights and fixed to a desired position via securing means 23. As part of the configuration shown in FIG. 2B, the exploded view of the shaft collar 21 is also shown coupled to a rotational means 25 (e.g., a rotational bearing means), to be discussed below, and in combination are both secured using the aforementioned securing means 23 (e.g., via a hex key, allen set screw or similar securing means known in the art) to provide a base support and rotational means for a given catch frame 2, as shown in detail in FIG. 2C.

FIG. 2C thus generally shows an example embodiment of an individual catch frame 2, to include a support framework 32, a catch material 2', and a rotational assembly 38. Each individual catch frame 2, as detailed in FIG. 2C and as also shown in example embodiment FIG. 1A and FIG. 1B, is designed to fit into a desired section (e.g., a shaking or fruit picking section below the one or more branches) of one or more fruit trees arranged in an orchard. Each individual catch frame itself having non-limiting dimensions of up to about 130 cm×130 cm as an example, is configured with the structural support framework 32 provided by a strong but lightweight material, such as, but not limited to, Polyvinyl Chloride (PVC) pipe, aluminum bars or pipes, flat stock mild steel, and/or galvanized steel that more often is configured as round steel tubing (not detailed). Soft insulating material, such as foam, often but not necessarily, covers any exposed hard surfaces.

The structural support framework 32 materials are desirably arranged with a slope contour designed to provide mechanical support for the catch material 2'. It is to be appreciated that the catch material is often a lightweight thin material (e.g., also denoted as reference character 2' in FIG. 4B and FIG. 4C to be discussed below) to fit into a shaking section, below the one or more branches and designed to retain the removed fruit, via the configured slope provided by the structural support framework 32.

The lightweight thin material 2' itself is often desirably configured using a cloth-like substance or a plastic mesh, such as a net-like material or vinyl mesh having a porosity to reduce the weight of the material but with a porosity so chosen to prevent fruit from falling through while also providing ease of handling the captured fruit. The lightweight thin material 2' (e.g., mesh) is secured to the structural support framework 32 using known methods in the art, such as by looping it over the structural support framework or by using tie-wraps, snaps, Velcro, hooks, or any commercial or custom other type of fastener to provide the desired secured result. A resilient material, such as a flexible chord (not shown), is also often utilized to divide the individual catch frame lightweight thin material 2' into one or more sections, often up to about three sections for efficiency in collecting captured fruit while minimizing deleterious bruising and/or abrasive damage.

FIG. 2D is an exploded view of primarily the rotational arm 38' that comprises a part of the overall rotational assembly 38, to include the shaft collar 21 and the rotational means 25 (e.g., a rotational bearing means) of FIG. 2B. The rotational arm 38', as shown in FIG. 2D, in actuality is shown in an upside configuration for ease of understanding to the reader. In particular, a sleeve 42 fixidly provided by the rotational arm 38', is configured with an inside diameter θ that slips over the outside diameter of rotational means 25 (e.g., bearing assembly) and configured to be rotated about up to 360 degrees. In addition, the rotational arm 38' having desired arm lengths A (e.g., often of 3 inches or more) and widths B (e.g., at least 1 inch in width and a thickness of at least ⅜ of an inch) is also secured to the structural framework using as aids, one or more bolt holes 41 configured in the rotational arm 38. Upon a desired rotation about the shaft post 21, the rotational arm 38 and coupled catch frame 2 is often secured to the shaft post 21 using a securing means (here not shown) similar to how the shaft collar 21 is secured to shaft post 20, as discussed above.

Figure 3A:
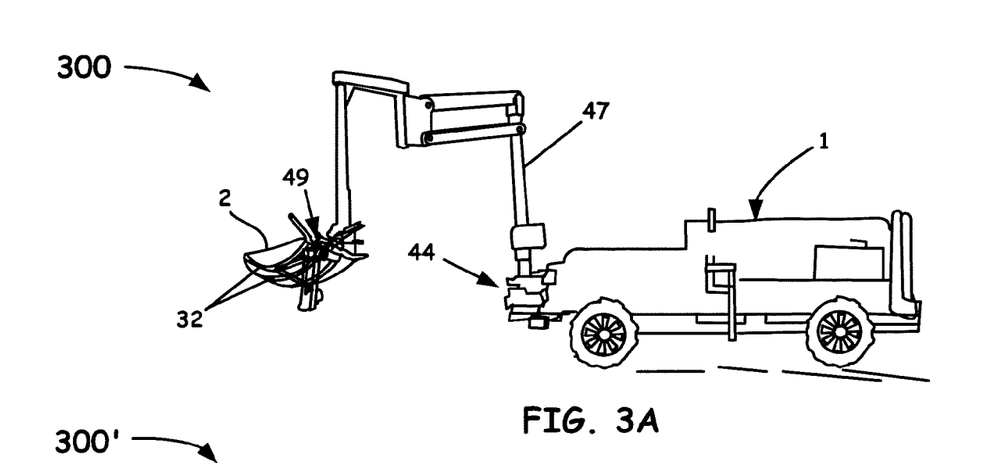
FIG. 3A illustrates a semi-autonomous eccentric shaking harvesting system of the present application.
Figure 3B:
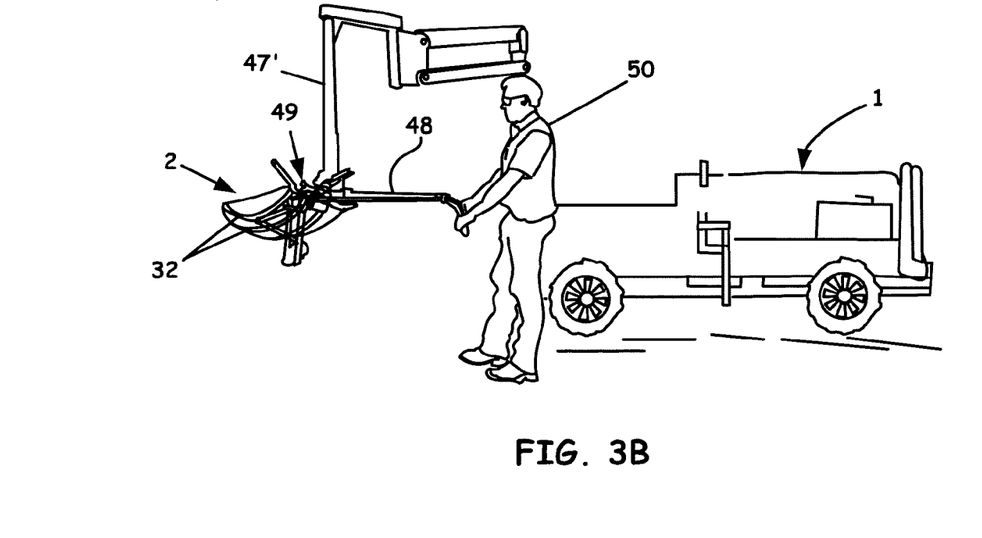
FIG. 3B shows a semi-autonomous eccentric shaking harvesting system wherein the positioning of the catch assembly and end-effector is manually provided by the operator of the harvester.

FIG. 3A and FIG. 3B illustrate exemplary non-limiting alternative embodiments of the present application that if desired, can also incorporate configurations, as discussed above. It is to be appreciated that as stated before, that like reference characters are utilized to illustrate similar or substantially similar components that were discussed above for alternative example embodiments.

Figure 4A:
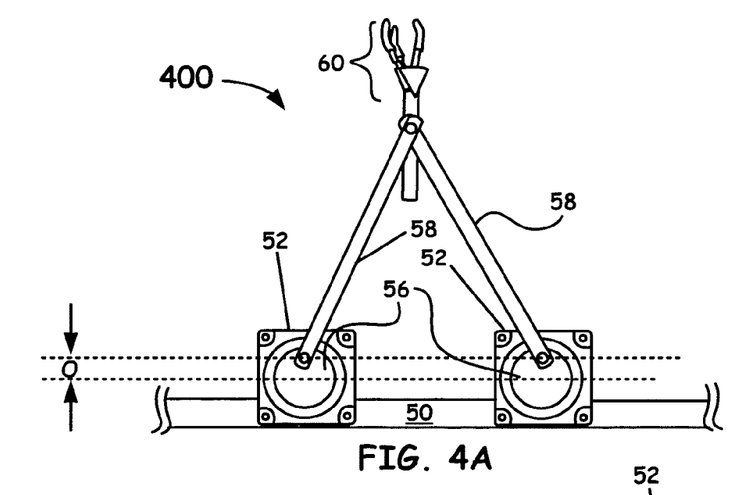
FIG. 4A illustrates an example end-effector gripper arrangement manipulated by a dual motor actuator (DMA).
Figure 4B:
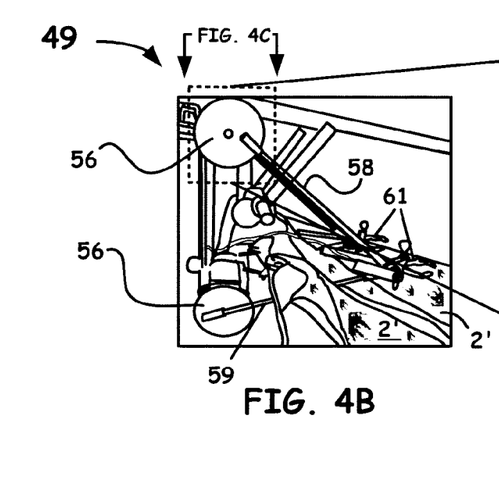
FIG. 4B shows a preferred configuration wherein the dual motor actuator configuration is eccentrically coupled to output shafts so as to provide motion to a plurality of contact desired points of branches or trellis wires of one or more pruned trees residing in a trained orchard.
Figure 4C:
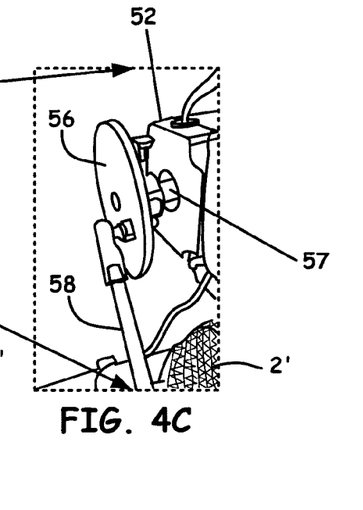
FIG. 4C shows an exploded view of a section of FIG. 4B to highlight eccentric mounting to an output shaft, as disclosed herein.

FIG. 3A in particular but in slight to contrast for the embodiments disclosed above, shows a semi-autonomous harvesting system, generally referenced by the character 300, that generally includes four main components: a mobile power unit 1 similar to that shown in FIG. 1A and FIG. 1B, a powered manipulator arm 47 maneuverably coupled at one end 44 to the mobile platform 1, an end-effector, preferably a dual motor end-effector (DMA) 49, and a catch frame 2 that is discussed below and shown in greater detail with respect to FIG. 4A, FIG. 4B, and FIG. 4C.

FIG. 3B, generally referenced by the character 300', illustrates another example configuration of a self-autonomous example version of that shown in FIG. 3A. Four main components are again utilized: a mobile power unit 1 similar to that shown in FIG. 3A, a powered manipulator arm 47 maneuverably coupled at one end 44 to the mobile platform 1, an end-effector, preferably a dual motor end-effector (DMA) 49, and a catch frame 2. In this example embodiment, it is to be noted that the manipulating arm 47 is as before but now the end-effector, which is again often a dual motor end-effector (DMA) 49, and catch frame 2 are directed by a manual (human 50 controlled) positioning arm 48. In this arrangement, the human 50 controlled positioning arm is free to rotate 360°. Additional degrees of freedom (tilt and lean) were designed into the positioning arm to allow for orchard contours that differ from true horizontal position. The components for either FIG. 3A or FIG. 3B can be designed for ready attachment, permitting rapid conversion between functionality. This versatility enhances the economic attractiveness of the embodiments disclosed herein.

It is to be noted that FIG. 3A and FIG. 3B show a single catch frame arrangement. However, it is to be appreciated that the catch frame can be also layered, similar to that shown in FIG. 1A and FIG. 1B, while coupled to the manipulating arm 47 so as to provide another novel yet working example configuration. In either configuration, a catch frame 2, as shown in FIG. 3A or FIG. 3B, or even a coupled layered catch frame assembly (not shown) is positioned therebetween the pruned (trained) trees in an orchard and under the fruit and when any number of fruit is pulled or shaken from respective stems, the fruit drops a desired short distance so as to be distributed to a particular catch frame 2.

As discussed above, the mobile platform 1 is often but not necessarily, a tractor-like commercial platform, such as, for example, a modified Blueline OPS Junior Orchard platform configured with a 4 cyl diesel engine and a hydraulic 4-wheel-drive system so as to be propelled through an orchard manually or automatically. Also similar to that discussed above, the commercial worker platforms are removed and the operator control panel are remounted so that the mobile platform 1 can be driven, when desired, from the ground.

It is to be noted that the manipulating arm 47 is often, but not necessarily, a powered off-the-shelf component (AAM-200) from Air Technical Industries (Mentor, Ohio) that is originally designed for industrial manufacturing. Other manipulating arms known to those skilled in the art can equally be incorporated however. Such a manipulator arm 47 uses an electric motor to drive a worm gearset to rotate the system about the z-axis. Manual stops limit the rotational degrees to 270°. The total rotation time is about 31 seconds for 270°. An electric actuator raised and lowered the height of the arm 47: range=0 to 108 cm; raise time=58 s; lower time=52 s.

Turning back to FIG. 3A and/or FIG. 3B, the end-effector 49 shown coupled to the manipulating arm 47, can as one example embodiment, be configured to interact (e.g., extension toward with contact and retraction from), sections therebetween trees with the disposed fruit on a desired tree limb or trellis wire via a gripping mechanism (discussed below) or a tool (not shown), such as motorized counter-rotating wheel mechanisms.

As before, a particular catch frame 2 as configured with a support framework 32 and a catch material 2', as shown in FIG. 4B and FIG. 4C, is designed to fit into a desired section (e.g., a shaking or fruit picking section below the one or more branches) of one or more fruit trees arranged in an orchard. Each individual catch frame 2 itself having non-limiting dimensions of up to about 130 cm×130 cm, often with 122 cm×91 dimensions as an example, is configured with the structural support framework 32 provided by a strong but lightweight material, such as, but not limited to, Polyvinyl Chloride (PVC) pipe, aluminum bars or pipes, flat stock mild steel, and/or galvanized steel that more often is configured as round steel tubing (not detailed). The catch frame 2 was flexible enough to adjust to any desired tree spacing not exactly provided by the dimensions given above. Soft insulating material, such as foam, often but not necessarily, covers any exposed hard surfaces.

The structural support framework 32 materials are desirably arranged with a slope contour, as somewhat illustrated in FIG. 3A and FIG. 3B, designed to provide mechanical support for the catch material 2' so as to fit into a shaking section, below the branch. Moreover, such structural support framework 32 is also configured to be mechanically coupled to the end-effector 49 and manipulating arm (47, 47') for ease of directing the combined working fruit shaking/catching components (end-effector 49 and catch frame 2) as a single assembly.

As discussed above, the catch material is often a lightweight thin material to fit into a shaking section, below the one or more branches and designed to retain the removed fruit, via the configured slope or other shapes known to those skilled in the art that can be utilized herein (e.g., V-shaped), as provided by the structural support framework 32.

The lightweight thin material 2' itself is often desirably configured using a cloth-like substance or a plastic mesh, such as a net-like material or vinyl mesh having a porosity to reduce the weight of the material but with a porosity so chosen to prevent fruit from falling through while also providing ease of handling the captured fruit. The lightweight thin material 2' (e.g., mesh) is secured to the structural support framework 32 using known methods in the art, such as by looping it over the structural support framework or by using tie-wraps, snaps, Velcro, hooks, or any commercial or custom other type of fastener to provide the desired secured result. A resilient material, such as a flexible chord (not shown), is also often utilized to divide the individual catch frame lightweight thin material 2' into one or more sections, often up to about three sections for efficiency in collecting captured fruit while minimizing deleterious bruising.

When the end effector 49 of FIG. 3A or FIG. 3B is a counter-rotating wheel mechanism arrangement, the material, as before, is often a soft material, such as, foam covered materials, soft rubber, and like materials, etc., with a high coefficient of friction to provide removal without damaging (e.g., bruising) the surface of the fruit. In a basic operating maneuver, the manipulating arm 47 is directed to desired hanging fruit on a tree and rapidly/efficiently pulls fruit from such trees from any number of branches.

It is to be appreciated however, that while a counter-rotating wheel mechanism arrangement can be utilized, FIG. 4A shows a desired end-effector 60 alternative novel and preferred arrangement (e.g., a jaw or clamp operating means), as referenced by the character 400, that grips a branch(s) or trellis wire and shakes the fruit from the trees. In the example configuration of FIG. 4A, the end-effector 60 is shown pinned to a pair of dual motors 52, (i.e., the dual motor actuator (DMA) connotation), which uses two eccentrics that are pinned together through one or more linkage arms 58 to manipulate a same or different frequency/a counter-propagating or same propagating motion to enable desired trajectories applied to one or more points, in this case, a single point on a branch or a desired trellis wire of a pruned tree(s) when grasped by the gripping end-effector section 60.

Thus, an eccentric, as utilized herein, refers to the circular disk 56 of the motors 52 (often stepper motors) fixed to a rotating axle 57, as shown in FIG. 4C, with its center offset (offset O denoted by directional arrows and dashed lines) from that of the axis of the axle 57 (thus the word "eccentric," out of the center) so as to provide a plurality of off-center trajectories to an applied point or points.

FIG. 4B and FIG. 4A show a preferred configuration wherein the dual motors 52 eccentric coupled discs 56 are connected to a cross-bar (not explicitly shown) via a pair of pinned linkage arms 58 and 59 so as to provide motion to a point on a tree as grasped by coupled end-effectors 61. Such an arrangement allows the coupled end-effectors 61 to contact desired points or branches of the pruned (trained) orchard trees unencumbered by interfering branches and other foliage in the horizontal plane of the cross-bar. It is to be noted that while pruned trees residing in an orchard is a primary target of the embodiments disclosed herein, it is to also be understood that pruned trees in an orchard is not necessary when using the configurations herein, especially if smaller varieties, such as, but not limited to vines, e.g., blueberry vines, for example, are to be harvested.

Thus, as an example, as either of the semi-autonomous configurations 300/300' of FIGS. 3A and 3B are advanced toward a particular row and set of trees, the end-effectors, such as that shown in FIG. 3B, contacts a desired point or points on limbs of often pruned trees or trellis wires when difficulty of applying the end-effectors to such limbs is encountered. Upon contact, the cross-bar coupled to the end-effectors 61 begin to oscillate in desired patterns in either a continuous, non-continuous, reciprocating and/or more often non-symmetrical motion. Thus, FIG. 5A shows a trio of non-limiting example patterns showing displacement along at least two dimensions that can be enabled via same or counter-propagating motions imparted to the shafts as coupled to an end-effector. Depending on the tenacity of the held fruit to a tree, various patterns to include, but not just limited to those shown in FIG. 5A, are utilized herein so as effectively remove fruit from a trained tree in an orchard. In addition, adjusted frequency patterns and amplitude of the shaker mechanism aids the process so that the novel catch frame configurations disclosed herein thereafter capture such fruit in a non-damaging manner.

As stated previously with respect to the configuration shown in FIG. 1A and FIG. 1B, the eccentric mechanism allows an infinite number of rhythmic patterns to be realized in a physically defined space related to the displacement, or radius, of an eccentric design mounted to a shaft (e.g., as shown in FIG. 4B). The DMA can be used to apply patterns to limbs at low frequency from about 50 Hz up to about 1000 Hz or even higher if desired in combinations of stop-start or continuous reciprocating and/or more often non-symmetrical motions. Specific rhythmic patterns can be achieved through programming speed and direction of each electric motor via the on-board controller.

As a non-limiting working example, the DMA can often comprise two 1.8°, 3.5 A, 1600 oz-in electric motors, two stepper drivers, and two 120 VAC to 65 VDC power supplies. An Arduino Mega can be used to control the drivers and motors using a Pulse-Width Modulation (PWM) technique. The DMA set-up shown in FIG. 4B often utilizes two steel eccentrics 56 mounted to the output shafts (e.g., 57, as shown in FIG. 4C) of the motors using set screws. Each link-arm 58, 59, can be a strong but often light-weight material, such as a material fabricated from 8 mm×30.5 cm round stock mild steel. A ball and socket 90° elbow fitting, as generally shown in FIG. 4C can be used to mount each link-arm to the eccentric. This allows for less friction transfer between the link-arm and eccentric. A shaft collar can be welded to a coupling nut and used to hold the branch grasping device. The end effector 61, e.g., a jaw gripping means, can be, for example, a standard three prong beaker clamp to grasp a fruiting limb or trellis wire. Two upright link-arm guides is often utilized to limit the z-axis movement of the link-arms during actuation.

The energy imparted by the design and the coupled patters in a novel and unobvious fashion remove fruit having various lengths of stem attachment to their respective tree branches. Also as before, a coupled catch frame to the systems 300, 300', as shown in FIG. 3A and FIG. 3B is positioned therebetween the trained trees in the orchard and under the fruit and when any number of fruit is shaken from respective stems, the plurality of fruit drops a desired short distance so as to be distributed to a single but in some cases, a designed catch frame array, similar to that shown in FIG. 1A and FIG. 1B.

The initial movement (i.e., energy/force) is often, but not necessarily, chosen to remove only the most readily detachable fruit. Depending on the type of fruit and thus the stem lengths of the coupled fruit to a respect tree limb, the amplitude imparted and/or the patterns described above increases and/or changes depending on the tenacity of the fruit remaining to be harvested. Moreover, if the end-effector 61 configurations disclosed herein encounters one or more trees that demand end-effector 61 spacing greater than the initial spacing along the cross-bar, or if the end-effector 61 configurations are misaligned, adjustment by the user may be warranted to compensate for the difference. Efficiency of fruit removal/harvesting by any of the configurations disclosed throughout the four corners of the present application is a function of both energy input, continuous, non-continuous, reciprocating and/or more often non-symmetrical motions chosen and placement of end-effector 61 designs.

The present invention will be more fully understood by reference to the following example experimental results, which are intended to be illustrative of the present invention, but not limiting thereof.

EXAMPLES

An experiment was performed on commercial grade 'Gala' apples to categorize the harvesting efficiency and damage rate of the semi-autonomous system. The trees in the orchard were trained to a 6 wire, horizontal limb fruiting wall architecture, with tree and row spacing of 1.1 m×2 m. The orchard is located in Prosser, Wash. The orchard rows were divided into sections (FIG. 5B) that included two end posts 80 and a central post 82. Nine trees, denoted in sections A and B, grew in-between each post, for a total of eighteen trees in a section. The majority of the trees were grown to a top trellis wire (e.g. $6^{th}$ wire 87) and had six limbs (e.g., branches 92) formally trained (restricted) to horizontal trellis wire 86 that spanned each section. Most of the trees had two formally trained limbs 92 to at least the 4th wire 89 (from ground). Some of the trees (<20%) did not have horizontal limbs growing on the fifth and sixth wires. The general wire spacing was 270 cm from ground to the $6^{th}$ wire 87. All fruiting laterals—limbs growing from the horizontal limbs—were pruned so that the maximum length was in a non-limiting fashion, approximately 20 cm from the trained branch.

Table 1 below illustrates the example factors of the experimentation using three levels of: pattern, rhythm, and actuation duration. Motor directions determined the distinct pattern and were set as either clockwise (CW) or counter-clockwise (CCW). The rhythms used were: 175, 200, and 250 RPM. The actuation duration was set to 5, 15, or 25 seconds. The time values were arbitrarily selected but based on a practical range that a machine would apply motion to a limb.

TABLE 1

Pattern and rhythm parameters used for evaluating dual motor actuator in orchards.

| | Variables | | |
|---|---|---|---|
| Level | Pattern (motor1:motor2) | Rhythm (RPM) | Time (s) |
| 1 | CW:CCW | 175 | 5 |
| 2 | CW:CW | 200 | 15 |
| 3 | CW:CW | 250 | 25 |

Twenty seven runs were randomly assigned to a fruiting section A, B and the experiment was replicated 4 times. A total of 108 fruiting sections (2 limbs per section) were tested. No tests were conducted in the trees closest to the end posts 80 (including pollenizers) or center trellis post 82. Also, no tests were made in a fruiting section if there was an overhead sprinkling system installed. The actuation was applied to the middle portion of the fruiting section where the grasper was attached to the closest limb (e.g., limb 92). If no limb was present, the end-effector was attached to the trellis wire. Since all of the limbs were tightly fastened to the trellis system using field tape, no distinction was made between the wire and the branch. The three lowest trellis layers 86 (limbs and wires) were used along an orchard section. The manipulator arm limited the reachable height of the end-effector and catch frame to the third wire.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

What is claimed is:

1. A trained orchard fruit harvesting system, comprising:
   a mobile platform;
   a manipulating arm operably coupled to a proximate end of the mobile platform;
   at least one end-effector coupled to a distal end of the manipulating arm and configured to be coupled using at least one of a jaw and a clamp to one or more branches of a fruit tree or a trellis wire that is coupled to the fruit tree residing in a trained orchard;
   a pair of dual motor actuators, wherein the dual motor actuators are eccentrically coupled to the at least one end-effector and directed to manipulate the at least one end-effector with at least one of a same of and different frequency, and amplitude, and with same or counter-propagating motions, wherein the directed same or different frequency and amplitude, and same or counter-propagating motions provide one or more eccentric shaking patterns to the coupled branches or the trellis wire; and
   one or more catch frames rotatably coupled to the mobile platform for movement within sections therebetween trees in a trained orchard having fruit to be harvested via the one or more eccentric shaking patterns.

2. The fruit harvesting system of claim 1, wherein the one or more catch frames is configured as a layered catch frame assembly mechanically coupled to the at least one end-effector.

3. The fruit harvesting system of claim 1, wherein the at least one end-effector is coupled to circular disks configured with the pair of dual motor actuators, wherein the circular disks are fixed to a rotating axle with respective dual motor actuators with the centers offset from that of the axis of the axles.

4. The fruit harvesting system of claim 3, wherein the coupled circular disks that aid in eccentric motions are connected to a cross-bar via linkage arms so as to provide motion to a point on a tree or a trellis wire within a trained orchard when the tree or the trellis wire is gripped by the coupled at least one end-effector.

5. The fruit harvesting system of claim 1, wherein the one or more catch frames is configured as a layered catch frame assembly coupled to a support shaft that is coupled to the mobile platform.

6. The fruit harvesting system of claim 5, wherein each of the one or more catch frames that comprises the layered catch frame assembly is additionally coupled to a rotational assembly to provide 360 degrees of movement.

7. The fruit harvesting system of claim 6, wherein the rotational assembly each is coupled to a bearing means for the rotation and a shaft collar coupled to the support shaft for height adjustment.

8. The fruit harvesting system of claim 6, wherein the layered catch frame assembly provides a padded, close proximity bed coupled to the rotational assembly to enable to be inserted selected from at least one of between and around fruit bearing trees.

9. The fruit harvesting system of claim 1, wherein the dual motor actuators are operated at low frequencies from about 50 Hz up to about 1000 Hz.

\* \* \* \* \*